Sept. 3, 1968  D. N. WALLER  3,400,242
RESISTANCE WELDING
Filed July 7, 1964  3 Sheets-Sheet 1
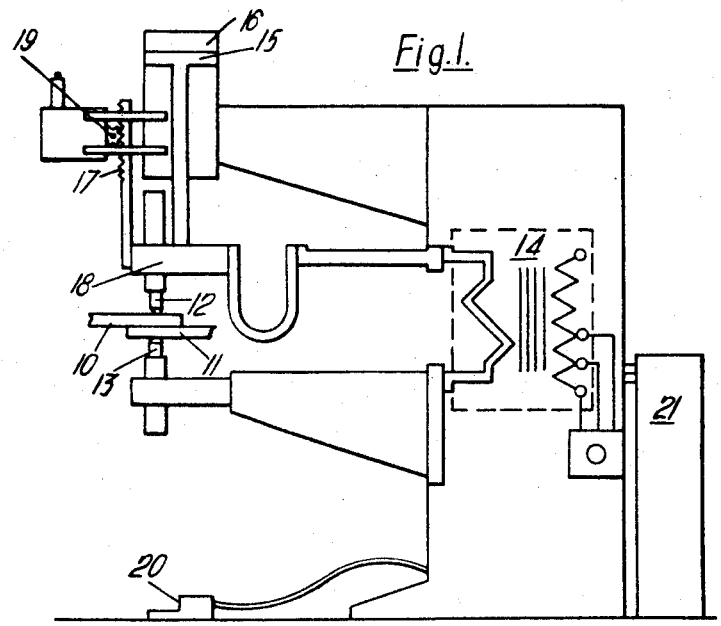
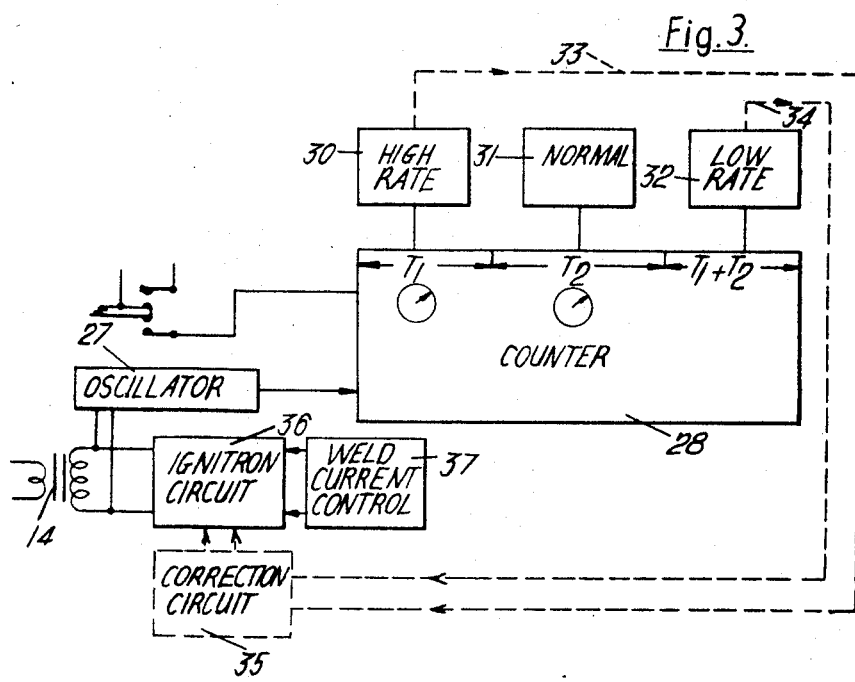
Inventor
David N. Waller
By *Kenzon Penner*
*Stewart v Estabrook*
Attorneys Sept. 3, 1968　　　D. N. WALLER　　　3,400,242
RESISTANCE WELDING Filed July 7, 1964　　　　　　　　　　3 Sheets-Sheet 2

Inventor
David N. Waller
By
Attorneys

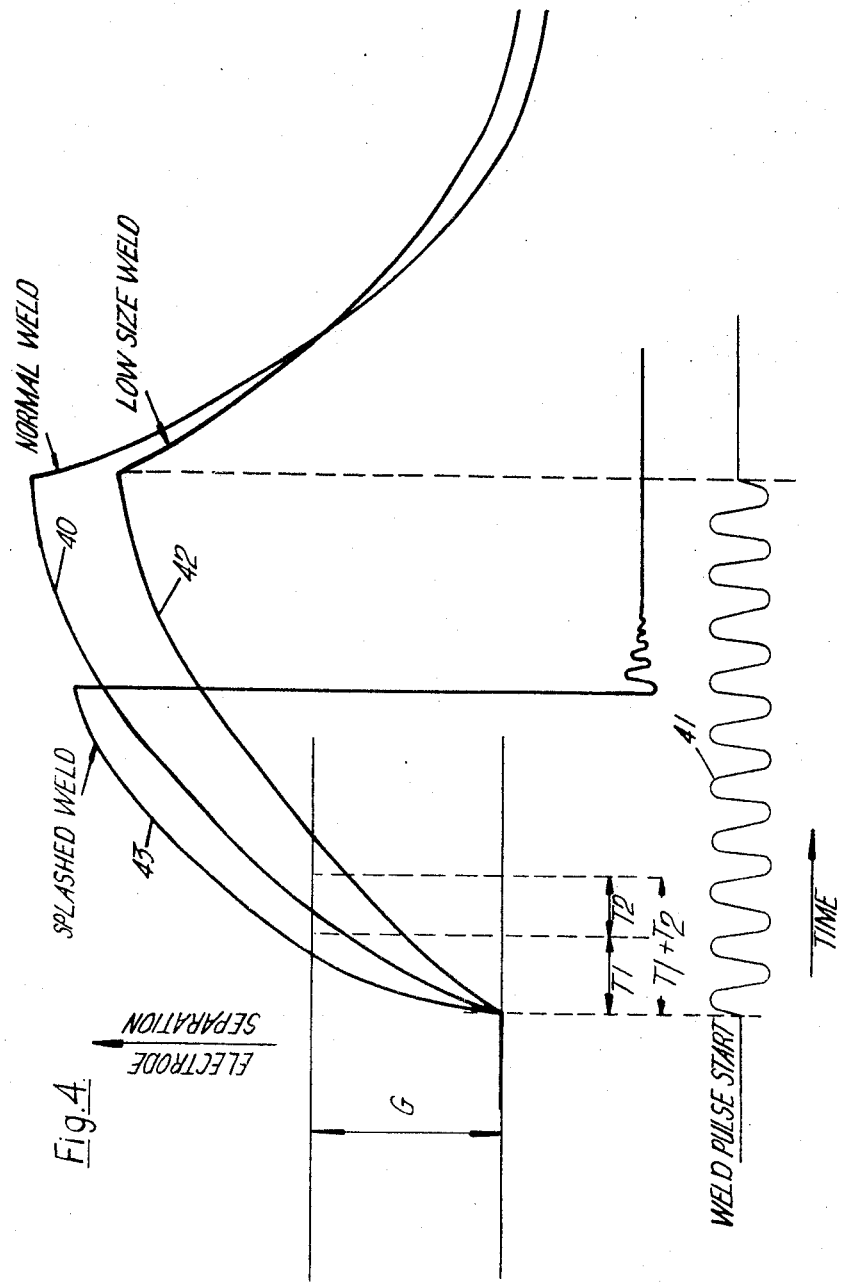

3,400,242
RESISTANCE WELDING
David N. Waller, London, England, assignor to British Welding Research Association
Filed July 7, 1964, Ser. No. 380,760
Claims priority, application Great Britain, July 11, 1963, 27,566/63
13 Claims. (Cl. 219—110)

ABSTRACT OF THE DISCLOSURE

To permit prediction of splashed and underheated welds in resistance welding, the rate of expansion of the workpieces between the electrodes during an initial portion of the welding operation is measured. The rate signal indicates the quality of the final weld and may be used to modify the heat input immediately after this initial portion so as to correct a weld which would otherwise be splashed or underheated.

---

This invention is concerned with resistance welding, in which two workpieces are squeezed between electrodes and a high current is passed to heat the workpieces at the sheet interface and weld them together. In such a process it is important that the welds shall be of a consistently high quality. An undersize weld may have low strength or may contain cracks or cavities. With stitch or seam welds, undersize welds will mean insufficient overlap and a leaky joint. An oversize weld means too great a heat input and this means excessive deformation or indentation of the workpiece and/or expulsion of weld metal (splashed welds). Splashed welds also give rapid electrode deterioration and welds of low strength. The object of the present invention is to provide an indication of weld quality or automatic control of weld quality.

In spite of attempts to hold constant the conditions for each of a number of resistance welds, it will be found that the welds obtained vary in quality. Broadly speaking, there are three parameters which can be altered in the resistance welding process, these being the electrode pressure, the magnitude of the weld current and the duration of the weld current. These parameters have different optimum values for different materials and sheet thicknesses. We have found that, while the electrode pressure and the duration of the weld current can be closely controlled by preset devices, the magnitude and the heat generated by the welding current will vary. The reason for this is that the workpieces present a number of paths for the current flowing between the electrodes and the resistance of these paths will vary with the surface condition of the material, the "fit" of the component and the closeness and number of neighbouring welds. In addition supply voltage fluctuations will vary the welding current. It is therefore desirable to indicate changes in heat input and therefore weld size. It is advantageous to provide a means for automatically correcting weld current.

Resistance welding is accompanied by electrode movement caused by the expansion of the workpiece and the change from solid to liquid state of a portion of the workpiece during the passage of the current. As the weld progresses this expansion is offset by the sinking of the electrode into the softened workpiece and when the current ceases cooling causes the electrodes to move together.

It has previously been proposed to use the electrode displacement as a measure of the quality of the weld or to provide automatic control of the welding operation. Thus in one prior proposal, the upward displacement of the electrode due to the expansion of the workpiece was used as a measure of the quality of the weld.

We have found that, although in some cases the relationship between the heat input, the heat loss and the electrode embedding is such that the maximum head displacement is roughly proportional to the heat input, in other cases the measurement of the upward displacement of the electrode is not a reliable guide to weld quality and cannot be used for satisfactory automatic control. Thus, although in a typical weld made in a heat-resisting material (e.g. stainless steel) the electrode separation continues until the end of the heating pulse, in a softer material having a good thermal conductivity (for example mild steel) the effect of the heat loss and electrode embedding outweighs the effect of the heat input towards the end of the heating pulse with the result that the electrodes start to move together again during the welding pulse. In such a case, the maximum electrode displacement may be substantially the same for good welds as it is for welds which are made with currents which are too high or too low and therefore the maximum electrode displacement cannot be used as a guide to the weld quality.

In addition, where expulsion of metal (splash) occurs the electrode displacement can be less than that of an acceptable weld, made with a lower heat input. A splashed weld results from too high a heat input which causes expulsion of liquid portions of the workpiece as a consequence of which the electrode may sink prematurely into the softened workpiece. Thus, the upward displacement of the electrode may be equal to or less than that which would result from a much lower current flow in a weld which was not splashed. An equal displacement would obviously provide an incorrect indication of quality in a method relying on displacement measurement. Reduced upward displacement would be interpreted in a method relying on maximum displacement for automatic control as an indication that more current was required whereas the current flow is already too great.

According to the present invention, the weld quality is ascertained by measuring the rate of separation of the electrodes due to the expansion of the workpiece during an initial portion of the resistance welding operation and comparing the measured rate value with a predetermined value or values which are known to correspond to different levels of weld quality. The comparison may result in an indication of the weld quality which can be used for inspection or to stop the machine if unsatisfactory welds are made (monitoring operation), or the comparison may produce a signal or a movement which adjusts a suitable weld parameter when the rate is too high or too low during the initial portion of the weld. The adjustment may be made either at the termination of that weld so that the next weld takes place under the modified conditions (open-loop control) or during the weld for which the measurement is made so that the new value of the parameter will have effect during the remainder of the weld period and will compensate for the initial error in rate of separation (closed-loop control). By measuring the rate of separation of the electrodes during the initial portion of the weld period, undersize, acceptable and oversize welds can be distinguished. Splashed welds can also be distinguished from welds resulting from correct or insufficient current flow since it will be indicated that the rate of electrode separation was too high in the period before the electrodes move together as the weld collapses.

Yet a further advantage of the present invention is that the measurement of the rate of separation of the electrodes can be made in a period less than that required for the maximum separation of the electrodes with the result that a greater portion of the weld period is left for an automatic control to take effect, in the case of closed-loop operation.

The measurement of the rate of separation of the electrodes may be made by measuring the time taken to achieve a given movement. Normally the upper electrode is movable and usually it will be the weld current which will be adjusted to compensate for the initial excess or deficiency of heating.

The preferred form of sensing element for measuring the rate of separation during the early part of the weld period includes a moving member which is driven through a slipping transmission by the movement of the upper electrode. This moving member of the sensing element moves across an adjustable gap between two stops, either of which can be used as a contact device.

The sensing element is connected to a monitor which consists of a counter with means for defining three consecutive time intervals, with provision for altering the limits of these intervals.

When the welding cycle is commenced the downward movement of the upper electrode before the weld current passes, holds the moving member against one stop. As the spot weld is made the electrode separation due to expansion causes the moving member to move from one stop to the other. The timer in the monitor is started when the weld current commences and is stopped when the moving member of the sensing element reaches the stop and closes a contact. If the contact is made during the first time interval, the rate of electrode separation is too high, an oversize (or splashed) weld will be made and this is indicated by the monitor. If contact is made after the first time interval but before the end of the second time interval the rate of electrode separation is within the permitted range and the monitor will indicate that an acceptable weld will be made. If the contact is not made during the first two time intervals the rate of electrode separation is too low and the monitor will indicate that an undersize weld (or no weld at all) has been made.

In order that the invention may be better understood one example of apparatus embodying the invention will now be described with reference to the accompanying drawings, in which:

FIGURE 1 shows diagrammatically the welding apparatus and the sensing element for measuring the electrode movement;

FIGURE 3 is a block diagram of the timing and control apparatus; and

FIGURE 4 shows curves illustrating electrode displacements for typical acceptable and unacceptable welds.

Figure 2:
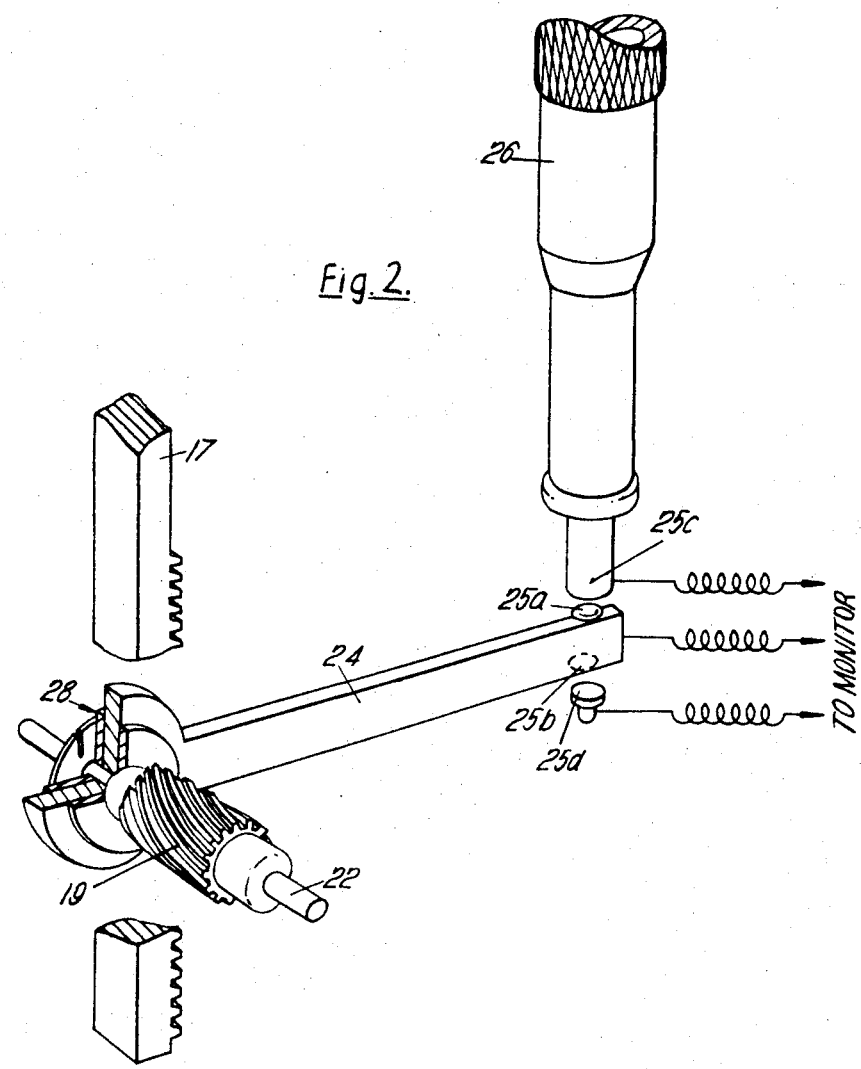
FIGURE 2 shows details of the sensing element.

In FIGURE 1 the two workpieces 10 and 11 are squeezed together between two copper electrodes 12 and 13 which are also the output terminals of the secondary winding of the welding transformer 14. The electrode 12 is movable and is normally held against the workpiece 10 with a pressure controlled by a piston 15 operating in an air cylinder 16. A rack 17 is connected to an arm 18 carrying the upper electrode 12 and drives a sensing element through a pinion 19. A foot switch 20 is provided for initiating the welding operations and a timer 21 controls the monitoring apparatus.

The sensing element is more fully illustrated in FIGURE 2. The pinion 19 driven by the rack 17 is mounted on a shaft 22 which transmits the rotary movement of the pinion through a friction clutch device 28 to a lever 24. The friction clutch device includes two friction pads bearing against an intermediate disc. The remote end of the lever 24 carries electrical contacts 25a and 25b and travels between two contact stops 25c and 25d so that by suitable movement of the lever electrical connection can be made between contacts 25a and 25c or between contacts 25b and 25d. The contact 25c is at the lower end of a micrometer 26 by means of which the separation between the contacts 25c and 25a can be adjusted.

When the electrode 12 is lowered towards the work the contact 25a on the lever 24 is pushed against the contact stop 25c on the foot of the micrometer. Further downward movement of the electrode merely causes slipping of the friction pads. When the electrode separation due to expansion commences, the rack 17 rises and the lever 24 moves across the gap from contact 25c to contact 25d. Further movement of the rack causes shaft 22 to rotate but does not affect the lever position owing to the presence of the friction pads in the transmission.

FIGURE 3 illustrates diagrammatically the timing apparatus. An oscillator 27 supplies pulses to a pulse counting device 28. Counting is initiated by the application to the oscillator of a pulse derived from the circuit of the primary of the welding transformer 14. The monitor shown in FIGURE 4 compares the time taken for the end of the lever 24 to move across the gap between the contacts with two adjustable time intervals $T_1$ and $T_1+T_2$ which define the limits of acceptable weld quality. Intervals $T_1$ and $T_2$ are preset in accordance with previous experience. If the time counted falls within the first time interval $T_1$ the circuit 30 indicates too high a rate of expansion of the workpiece. If the time counted falls during the second time interval $T_2$ the circuit 31 indicates that the expansion rate is normal and therefore that an acceptable weld will be produced. If the time counted is longer than $(T_1+T_2)$ the circuit 32 indicates that the expansion rate is too low. The circuits 30 and 32 can be used for an audible warning or to stop further welding and all three circuits 30, 31 and 32 can be used with an external recorder to provided a permanent record of weld quality.

Circuits 30 and 32 can also be used for automatic quality correction, as shown by the dotted connections 33 and 34 and the correction circuit 35, which when brought into operation adjusts the amplitude of the current supplied to the electrodes for the remainder of the weld by altering the firing angle of the ignitron circuit 36 supplying the welding transformer 14. If, for example, the time counted by the monitor is shorter than $T_1$ (i.e. the rate of electrode separation is too high) the correction unit 35 will increase the firing angle delay of the ignitron circuit and reduce the current amplitude at the electrodes for the remainder of the weld. If the time counted is greater than $(T_1+T_2)$ (i.e. the rate of electrode separation is too low) the correction unit 35 will reduce the firing angle delay of the ignitron circuit and the current amplitude at the electrodes is increased for the remainder of the weld. The correction of the current supplied to the weld will vary in extent with the error in the rate of expansion. Circuit 37 is the normal weld current control circuit.

FIGURE 4 shows curves of electrode separation against time for three cases: an oversize weld (in this case a splashed weld) an acceptable weld and an undersize weld. The time limits $T_1$ and $(T_1+T_2)$ for the movement of the arm 24 across the gap G are also shown. The curve 40 passes through the horizontal line defining the gap G at an instant which is within the interval $T_2$ and represents the expansion curve of a typical acceptable weld. Expansion continues until the end of the welding current 41. Curve 42 represents a welding operation in which the time taken to traverse the gap G is longer than $(T_1+T_2)$ i.e. in which the rate of electrode separation is too low. If uncorrected, expansion will continue until the end of the welding current burst but the resulting weld will be undersize. Curve 43 represents a welding operation with too high a rate of initial expansion, the gap G being traversed in a time less than $T_1$. The curve shown assumes that no correction is introduced and that a splashed weld results, the electrodes collapsing before the end of the welding current, although it should be understood that too high a separation rate may produce an oversize weld which is not splashed. It will be clear that by measuring the rate of initial separation a correction can be introduced even in the case of an electrode separation rate which would otherwise result in a splashed weld. In the case of a monitor without automatic correction, the monitor could be arranged to indicate the likelihood of a splashed weld and could be arranged to switch off the welding current before splashing occurs.

It will be appreciated that electrical or hydraulic methods can be used to measure rate of electrode separation in place of the method described above, and that continuous rate sensing could be employed in automatic control apparatus. The invention is applicable to the spot, stitch or roll-spot welding processes and for the seam welding process below peripheral wheel speeds of 8 in./min.

I claim:

1. A method of ascertaining weld quality in a spot stitch or seam resistance welding process, the steps comprising: measuring the rate of separation of the electrodes due to the expansion of the workpiece during an initial portion of the welding operation; and comparing said rate with rates of electrode separation for which the weld quality has previously been ascertained.

2. A method according to claim 1, in which the rate of separation is measured by the time taken for a predetermined distance of electrode separation during the initial portion of the welding operation; and in which said time is compared with preset time values for the said distance; and includes the step of indicating whether the said time falls within a predetermined range of time values corresponding to a range of values of rate of electrode separation known to produce welds of the required quality.

3. A method according to claim 1 including, when the rate of the separation of electrodes in the initial portion of the welding operation is not such that an acceptable weld will be produced, the step of correcting a variable welding parameter before the commencement of the next weld, the adjustment being in such a sense as to cause the rate of electrode separation in the next weld to approach a predetermined standard value.

4. A method according to claim 1 including, when the rate of separation of the electrodes during the initial portion of the welding operation does not correspond to a desired rate of electrode separation, the additional step of applying a correction to adjust a variable welding parameter during the remainder of the same welding operation in such a manner as to give a weld of the required quality.

5. A method according to claim 3 in which the welding parameter which is varied to correct the rate of electrode separation is the welding current amplitude.

6. Apparatus for ascertaining the quality of a weld produced in a spot, stitch or seam resistance welding process, comprising: a comparator having means preset in accordance with values of initial rate of electrode separation for which the weld quality is known; means driven by one of the electrodes and responsive to the rate of separation of the electrodes during an initial portion of a welding operation; connected to said comparator, said comparator providing an output indicating whether acceptable or unacceptable welds will be produced as a result of the said resistance welding operation.

7. Apparatus according to claim 6, in which said comparator includes a timer defining a predetermined interval; means responsive to the time taken for a given movement of electrode separation in a resistance welding operation; and means indicating whether the said time falls within said predetermined interval.

8. Apparatus according to claim 7 in which said timer includes a first adjustable timing device for defining a time delay corresponding to the maximum acceptable rate of electrode separation and a second adjustable timing device defining a time delay corresponding to the minimum acceptable rate of electrode separation; and means operative when the actual time taken for the given movement of electrode separation is outside the range defined by said first and second timing devices to provide an output indicating that the initial rate of electrode separation corresponds to an unacceptable weld.

9. Apparatus according to claim 7, in which said timer comprises a pulse generator and a pulse counter, the apparatus further including means responsive to the completion of a given movement of electrode separation before or after the receipt by the pulse counter of minimum and maximum predetermined numbers of pulses to provide an output indicating whether the initial rate of electrode separation is acceptable or unacceptable.

10. Apparatus according to claim 6, including correction means responsive to an incorrect initial rate of separation of the electrodes to adjust the amplitude of the current applied to the welding electrodes.

11. Apparatus according to claim 7, including a slipping transmission and a member driven thereby in a first direction or in the opposite direction by relative movement of approach or separation of the electrodes; first and second stops limiting the movement of said member in the first direction and the opposite direction, respectively, and defining the given movement of electrode separation; and means responsive to contact between the member and second stop to indicate that the given movement of separation of the electrodes has been completed.

12. Apparatus according to claim 11, in which said stops comprise electric contacts; said apparatus further including a timer control circuit and means connecting said contacts to said timer circuit.

13. A method according to claim 4 in which the welding parameter which is varied to correct the rate of electrode separation is the welding current amplitude.

References Cited

UNITED STATES PATENTS

| | | | |
|---|---|---|---|
| 2,848,595 | 8/1958 | Van Sciver | 219—110 |
| 2,851,584 | 9/1958 | Sciaky | 219—86 |
| 3,094,608 | 6/1963 | Archer | 219—110 |
| 3,191,441 | 6/1965 | Erickson | 219—110 |

RICHARD M. WOOD, *Primary Examiner.*

P. W. MAY, *Assistant Examiner.*